US011929876B1

(12) United States Patent
Xie et al.

(10) Patent No.: US 11,929,876 B1
(45) Date of Patent: Mar. 12, 2024

(54) METHOD FOR MODIFYING NETWORK CONFIGURATION OF RESOURCE MANAGER AND MANAGED RESOURCES

(71) Applicant: Dell Products L.P., Round Rock, TX (US)

(72) Inventors: Weiyi Xie, Shanghai (CN); Yuan Li, Suzhou (CN); Guiping Zhang, Fuzhou (CN); Howe Xu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/963,815

(22) Filed: Oct. 11, 2022

(30) Foreign Application Priority Data

Sep. 27, 2022 (CN) .......................... 202211186464.7

(51) Int. Cl.
*H04L 41/082* (2022.01)
*H04L 41/08* (2022.01)
*H04L 41/0859* (2022.01)

(52) U.S. Cl.
CPC ........ *H04L 41/082* (2013.01); *H04L 41/0863* (2013.01); *H04L 41/0886* (2013.01)

(58) Field of Classification Search
CPC ............... H04L 41/082; H04L 41/0863; H04L 41/0886
See application file for complete search history.

(56) References Cited

U.S. PATENT DOCUMENTS

| 11,025,453 | B2* | 6/2021 | Panse | H04L 41/0273 |
|---|---|---|---|---|
| 2010/0120432 | A1* | 5/2010 | Watfa | H04W 76/18 |
| | | | | 455/436 |
| 2017/0026492 | A1* | 1/2017 | Kawamura | H04L 67/61 |
| 2021/0028987 | A1* | 1/2021 | Krivenok | H04L 41/0869 |
| 2021/0096878 | A1* | 4/2021 | Chomakov | G06F 9/5027 |

* cited by examiner

*Primary Examiner* — Ario Etienne
*Assistant Examiner* — Kidest Mendaye
(74) *Attorney, Agent, or Firm* — Jackson Walker L.L.P.

(57) ABSTRACT

Disclosed methods include sending, from a resource manager, network configuration information to each of one or more managed resources. The network configuration information may include an IP address for the resource manager, an IP address for each of the managed resources, and a predetermined timeout value. Network configurations for the resource manager and the one or more managed resources may then be set after which each managed resource may start a timer with the predetermined timeout value. If the resource manager detects successful completion of each of the network configuration operations, the resource manager may send a stop timer command to each of the managed resources. If a timeout occurs, the timeout will inform each of the managed resources that the change in network configuration was not entirely successful. The resource manager and each of the managed resources will then restore their network configurations to their previous configurations.

9 Claims, 2 Drawing Sheets

METHOD FOR MODIFYING NETWORK CONFIGURATION OF RESOURCE MANAGER AND MANAGED RESOURCES

TECHNICAL FIELD

The present disclosure relates to information handling systems and, more particularly, management of virtualized information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be implemented as hyperconverged infrastructure (HCI) resources featuring virtualized compute, storage, and network resources with centralized and automated management. An exemplary line of HCI products is the VxRail family of HCI appliances from Dell property. HCI appliances may support and/or include an HCI manager that facilitates management of HCI-based clusters. In some embodiments, an HCI manager may impose limitations on the configurability of the platform. As an example, an HCI manager may prevent users from modifying the network configuration of the HCI manager itself under proscribed conditions. Such limitations and restrictions are generally undesirable.

SUMMARY

Common problems associated with reconfiguring network settings for a resource manager and one or more managed resources are addressed by systems and methods disclosed herein. In at least one embodiment, each managed resource corresponds to a host in a multi-node hyper converged infrastructure (HCI) cluster. Some or all of the nodes may be implemented with a suitable HCI appliance featuring virtualized compute, storage, and network resource with centralized and automated management. A commercially distributed example of an HCI appliance suitable for use in conjunction with disclosed teachings is the VxRail line of HCI appliances from Dell Technologies. It should be understood, however, that the enclosed teachings are not limited to any specific make or model of information handling system resources.

In one aspect, disclosed methods include sending, from the resource manager, network configuration information to each of the managed resources. In embodiments employing one or more HCI appliances configured to provide an HCI cluster, each of the managed resources may be hosts in the HCI cluster and the resource manager may include features and functionality analogous to features and functionality included in VxRail Manager software from Dell Technologies. The network configuration information may include an IP address for the resource manager, and IP address for each of the managed resources, and a predetermined timeout value to be used by the hosts in confirming network configuration changes.

After the network configuration information has been sent, network configuration operations may then be performed. The network configuration operations may include (1) setting a network configuration for the resource manager in accordance with resource manager information included in the network configuration information and (2) setting a network configuration of each managed resource in accordance with managed resource information included in the network configuration information. After performing the network configuration operations, each managed resource may start a timer with the predetermined timeout value indicated in the network configuration information. The resource manager may be configured to monitor for successful completion of each command. If the resource manager detects successful completion of each of the network configuration operations, the resource manager may send a stop timer command to each of the managed resources as a means of communicating to each managed resource that the network configuration changes were successfully completed. If a timeout occurs, i.e., the timer expires, before the resource manager sends the stop timer command, the timeout will information each of the managed resources that the change in network configuration was not entirely successful and, accordingly, the resource manager and each of the managed resources will restore their respective network configurations to their previous configurations.

Disclosed features beneficially enable management software and managed nodes to change network configuration simultaneously. Managed resources use a timer to wait for the resource manager to indicate that the managed resource is still accessible to the resource manager. The resource manager restores its own network configuration when it detects a lost connection with any of the managed resources after a new network configuration has been applied.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
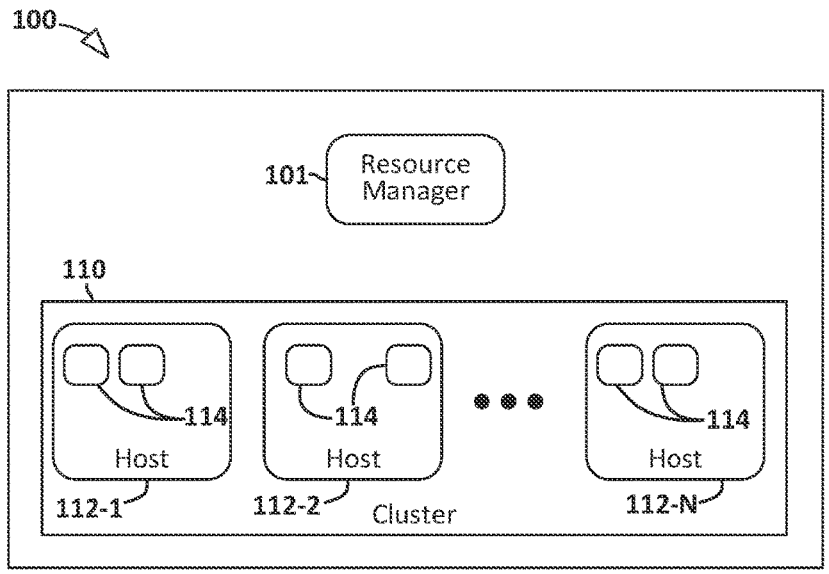
FIG. 1 illustrates an HCI platform suitable for use in conjunction with disclosed teachings.
Figure 2:
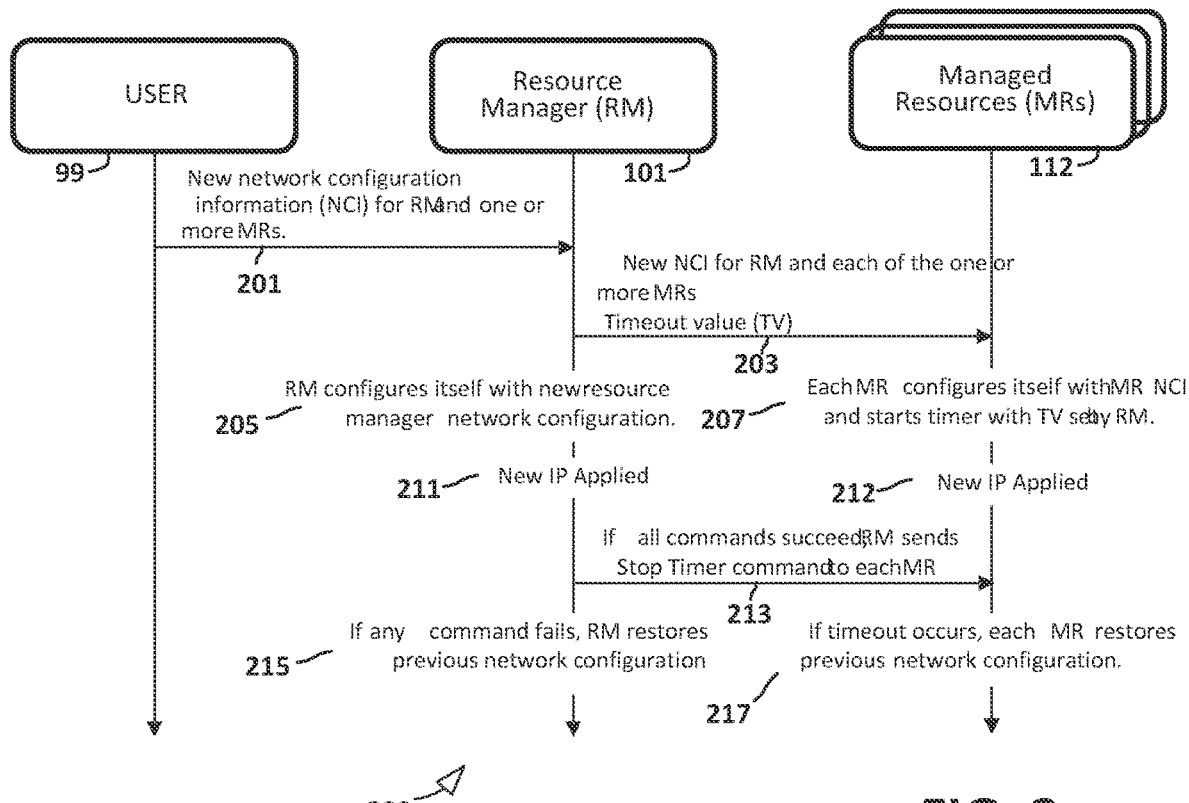
FIG. 2 illustrates a sequence diagram for modifying the network configuration of an HCI platform in accordance with disclosed teachings.
Figure 3:
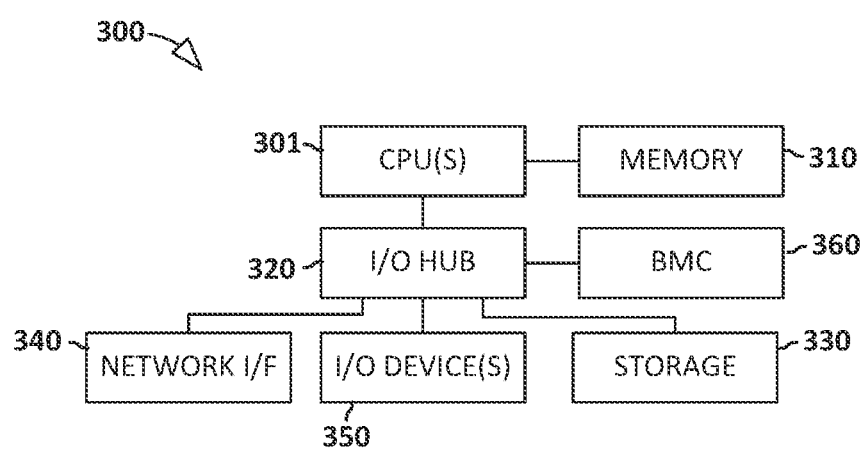
FIG. 3 illustrates an exemplary information handling system suitable for use in conjunction with system and methods disclosed in FIG. 1 and FIG. 2.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an HCI platform 100 in accordance with disclosed teachings for modifying the network configuration of a resource manager and the managed resources at the same time. As depicted in FIG. 1, HCI platform 100 includes a resource manager 101 and a virtualized information handling resource identified as cluster 110. The illustrated cluster 110 includes a plurality of hosts 112, of which FIG. 1 illustrates three (host 112-1, 112-2, and 112-N). Each host 112 illustrated in FIG. 1 is illustrated with one or more virtual machines 114 running in one of the hosts 112. Each host 112 may be implemented with a corresponding HCI appliance, such as a VxRail appliance discussed previously. Resource manager 101 may be implemented with one or more features of software such as VxRail Manager software from Dell Technologies.

Turning now to FIG. 2, a sequence diagram 200 illustrates a method or process for supporting the simultaneous modification of network configuration information for a resource manager, such as an HCI manager, and its managed resources, such as cluster hosts. The illustrated sequence diagram 200 begins with user 99 providing (Step 201) network configuration information for resource manager 101 and for each of the one or more managed resources 112. The illustrated resource manager 101 then sends (step 203) to the managed resources 112 configuration data including new network configuration information for each of the managed resources 112 along with a timeout value, discussed in more detail below, and new network configuration information for resource manager 101. The illustrated sequence diagram 200 further includes the resource manager configuring itself (step 205) with the new resource manager network configuration in accordance with network configuration information provided from resource manager 101. Similarly, each managed resource 112 configures (step 207) itself with the managed resource network configuration information. As depicted in FIG. 2, the resource manager 101 may then apply (operation 211) the new IP address discussed above and, likewise, each managed resource 112 may apply (step 212) the new network configuration information. In addition to setting its network configuration information, each managed resource 112 may also start an internal timer with a timer value equal to a timer value received from resource manager 101 in step 203 discussed above.

If resource manager 101 determines that each of the reconfiguration commands has completed successfully, resource manager 101 sends (step 213) a stop timer command to each of the managed resources 112. If, on the other hand, a managed resource detects a timeout before the managed resource receives a stop command from resource manager 101, the managed resource will restore its network configuration to the previous or last known good network configurations. In this manner, managed resources 112 recognize the timeout as an indication that the resource manager 101 is no longer accessible to the one or more managed resources 112. In such circumstances, each managed resource 112 and the resource manager 101 will restore (steps 215 and 217) their network configurations to the previous or last known good configurations.

Referring now to FIG. 3, any one or more of the elements illustrated in FIG. 1 through FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
   sending configuration data and a timeout value from a resource manager to a plurality of managed resources within a hyper-converged infrastructure (HCI) cluster;
   performing network configuration operations including:
      setting a network configuration of the resource manager in accordance with resource manager network configuration information included in the configuration data; and
      for each managed resource of the plurality of managed resources, setting a network configuration far of the managed resource in accordance with managed resource network configuration information included in the configuration data and starting a timer having the timeout value;
   responsive to detecting each managed resource of the plurality of managed resources successfully setting its network configuration, sending a stop timer command to each of the plurality of managed resources; and
   responsive to any managed resource of the plurality of managed resources detecting a timeout of the timer, restoring, by the managed resource, its network configuration to a previous configuration, restoring by the resource manager, its network configuration to a previous configuration, and withholding, by the resource manager, the stop timer command wherein the network configuration of the resource manager and each managed resource is restored to a previous value if any of the managed resources detects a timeout.

2. The method of claim 1, wherein each managed resource of the plurality of managed resources comprises a host of the HCI cluster.

3. The method of claim 1, wherein the network configuration information for the resource manager includes an IP address of the resource manager and wherein the network configuration information for each managed resource of the plurality of managed resources comprises an IP address of the managed resource.

4. An information handling system, comprising:
   a central processing unit (CPU); and
   a computer readable memory, accessible to the CPU, including executable instructions that, when executed by the CPU, cause the system to perform operations including:
   sending configuration data and a timeout value from a resource manager to a plurality of managed resources within a hyper-converged infrastructure (HCI) cluster;
   performing network configuration operations including:
      setting a network configuration of the resource manager in accordance with resource manager network configuration information included in the configuration data; and
      for each managed resource of the plurality of managed resources, setting a network configuration of the managed resource in accordance with managed resource network configuration information included in the configuration data and starting a timer having the timeout value;

responsive to detecting each managed resource of the plurality of managed resources successfully setting its network configuration, sending a stop timer command to each of the plurality of managed resources; and responsive to any managed resource of the plurality of managed resources detecting a timeout of the timer, restoring, by the managed resource, its network configuration to a previous configuration, restoring by the resource manager, its network configuration to a previous configuration, and withholding, by the resource manager, the stop timer command wherein the network configuration of the resource manager and each managed resource is restored to a previous value if any of the managed resources detects a timeout.

5. The information handling system of claim 4, wherein the each managed resource of the plurality of manage resources comprises a host of the HCI cluster.

6. The information handling system of claim 4, wherein the network configuration information for the resource manager includes an IP address of the resource manager and wherein the network configuration information for the each managed resource of the plurality of managed resources comprises an IP address of the managed resource.

7. A non-transitory computer readable medium, including processor executable instructions that, when executed by a processor of an information handling system, cause the system to perform operations including:

sending configuration data and a timeout value from a resource manager to a plurality of managed resources within a hyper-converged infrastructure (HCI) cluster;

performing network configuration operations including:
setting a network configuration of the resource manager in accordance with resource manager network configuration information included in the configuration data; and for each managed resource of the plurality of managed resources, setting a network configuration of the managed resource in accordance with managed resource network configuration information included in the configuration data and starting a timer having the timeout value;

responsive to detecting each managed resource of the plurality of managed resources successfully setting its network configuration, sending a stop timer command to each of the plurality of managed resources; and responsive to any managed resource of the plurality of managed resources detecting a timeout of the timer, restoring, by the managed resource, its network configuration to a previous configuration, restoring by the resource manager, its network configuration to a previous configuration, and withholding, by the resource manager, the stop timer command wherein the network configuration of the resource manager and each managed resource is restored to a previous value if any of the managed resources detects a timeout.

8. The non-transitory computer readable medium of claim 7, wherein each managed resource of the plurality of managed resources comprises a host of the HCI cluster.

9. The non-transitory computer readable medium of claim 7, wherein the network configuration information for the resource manager includes an IP address of the resource manager and wherein the network configuration information for each managed resource of the plurality of managed resources comprises an IP address of the managed resource.

* * * * *

UNITED STATES PATENT AND TRADEMARK OFFICE
CERTIFICATE OF CORRECTION

PATENT NO. : 11,929,876 B1
APPLICATION NO. : 17/963815
DATED : March 12, 2024
INVENTOR(S) : Xie et al.

It is certified that error appears in the above-identified patent and that said Letters Patent is hereby corrected as shown below:

In the Claims

Column 6, Lines 13-41 should read:
1. A method comprising:
    sending configuration data and a timeout value from a resource manager to a plurality of managed resources within a hyper-converged infrastructure (HCI) cluster;
    performing network configuration operations including:
        setting a network configuration of the resource manager in accordance with resource manager network configuration information included in the configuration data; and
        for each managed resource of the plurality of managed resources, setting a network configuration far of the managed resource in accordance with managed resource network configuration information included in the configuration data and starting a timer having the timeout value;
    responsive to detecting each managed resource of the plurality of managed resources successfully setting its network configuration, sending a stop timer command to each of the plurality of managed resources; and responsive to any managed resource of the plurality of managed resources detecting a timeout of the timer, restoring, by the managed resource, its network configuration to a previous configuration, restoring by the resource manager, its network configuration to a previous configuration, and withholding, by the resource manager, the stop timer command wherein the network configuration of the resource manager and each managed resource is restored to a previous value if any of the managed resources detects a timeout.

Column 7, Lines 19-21 should read:
5. The information handling system of claim 4, wherein the each managed resource of the plurality of manage resources comprises a host of the HCI cluster.

Column 7, Lines 23-28 should read:
6. The information handling system of claim 4, wherein the network configuration information for the resource manager includes an IP address of the resource manager and wherein the network Signed and Sealed this
Thirtieth Day of April, 2024

*Katherine Kelly Vidal*

Katherine Kelly Vidal
*Director of the United States Patent and Trademark Office* configuration information for the each managed resource of the plurality of managed resources comprises an IP address of the managed resource.